United States Patent [19]
Robinson

[11] 3,852,790
[45] Dec. 3, 1974

[54] UNIVERSAL MOUNT FOR ELECTRONIC FLASH UNIT

[75] Inventor: Jack A. Robinson, Chicago, Ill.

[73] Assignee: Acme-Lite Manufacturing Co., Chicago, Ill.

[22] Filed: June 7, 1973

[21] Appl. No.: 367,780

[52] U.S. Cl.............. 354/145, 354/141, 354/126, 240/1.3
[51] Int. Cl. ........................................ G03b 15/05
[58] Field of Search ............ 95/11 L, 11.5 R, 11 R; 240/1.3

[56] References Cited
UNITED STATES PATENTS

| | | | |
|---|---|---|---|
| 2,644,380 | 7/1953 | Mendelsohn.................... | 240/1.3 |
| 2,949,838 | 8/1960 | Skalabrin....................... | 240/1.3 |
| 3,465,138 | 9/1969 | Long............................... | 95/11.5 R |
| 3,550,514 | 12/1970 | Harvey............................ | 95/11 L |
| 3,672,813 | 6/1972 | Horton............................ | 95/11.5 R X |
| 3,703,131 | 11/1972 | Brigham........................... | 95/11 L |

Primary Examiner—Robert P. Greiner
Attorney, Agent, or Firm—Alter Weiss Whitesel & Laff

[57] ABSTRACT

An electronic flash unit has a sliding or movable contact with a cross-section which fits into contacts (such as flash cube contacts) built in a camera. The sliding contact may be a plastic plug for making a mechanical connection, with an electrical circuit being completed by other means. For mechanical stability, the flash unit also includes either a sliding bracket which may be attached to a tripod socket on the camera or a c-clamp and cam assembly.

11 Claims, 10 Drawing Figures

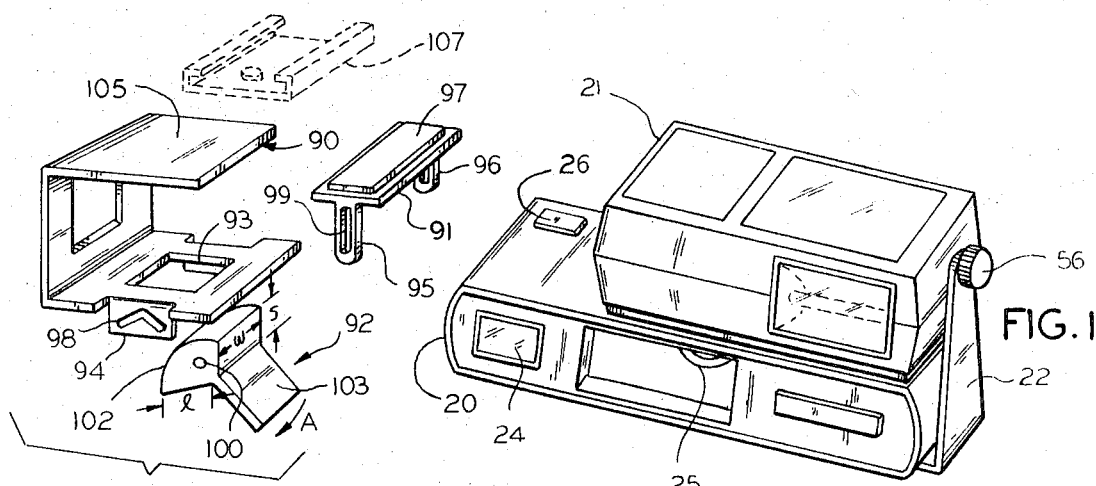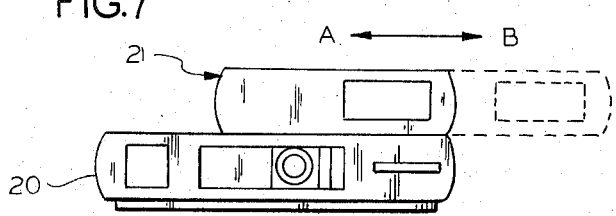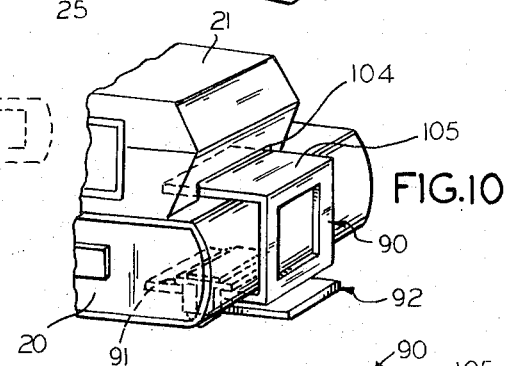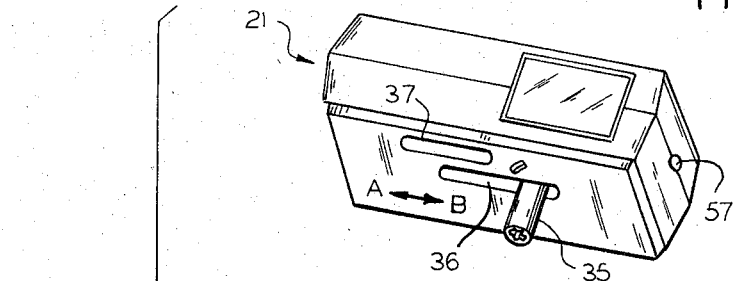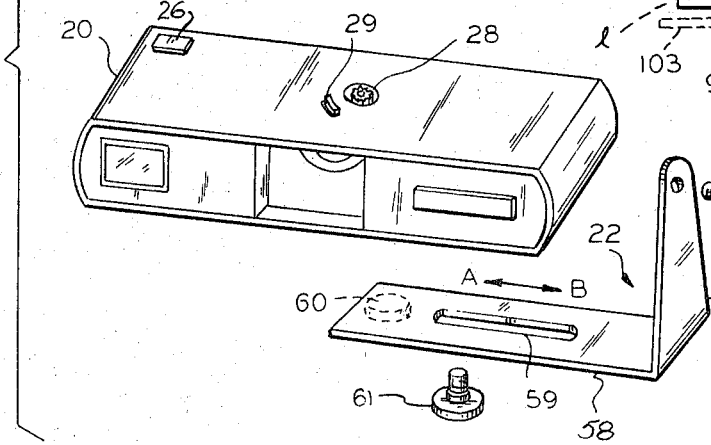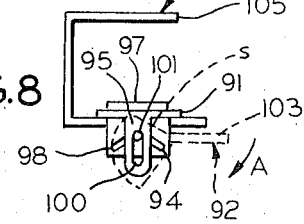

PATENTED DEC 3 1974

UNIVERSAL MOUNT FOR ELECTRONIC FLASH UNIT

This invention relates to flash attachments having means for reducing and controlling "red eye," and more particularly to universal attachments which fit a great number of different cameras — especially, though not exclusively, to low cost cameras.

"Red eye" is a phenomenon which often occurs when flash attachments are used with cameras. In greater detail, the usual procedure is to attach a flash unit to a camera in the vicinity of the lens. When the flash goes off, a beam of light is projected toward a subject, and the image of the subject is reflected to the camera lens. The retina and lens of the eye have a mirror-like quality for reflecting light. Therefore, if the angle of reflection is such that the light from the flash unit is reflected directly into the lens of the camera, the subject will appear to have red beady eyes. Accordingly, it is desirable to displace the flash unit far enough away from the camera so that the image reflected by the subject's eye normally will not directly strike the camera lens.

Another problem exists because of the physical differences between the various makes of essentially the same camera. For example, one well known camera company may design a camera system including a special type instant or pocket camera, a film pack fitting that camera, and a flash device that snaps or otherwise fits into the camera. Usually the flash unit is a special kind of device, such as a flash cube, which may or may not also rotate, and the contacts are also of a special and unique design. Later models of the same camera type may have adaptations to accept entirely different kinds of flash units. Then other companies copy the camera type, usually with minor modifications. Thus, the location of the flash unit attachment, the mounting bracket, and the like may be at any of many different locations on the camera body. Each of these different camera types often has several varieties of shutter and lens assemblies extending from very low cost to relatively high cost devices. The flash device will also range from low to high cost.

Hence, the problems of making a universal electronic flash unit are considerable. The usual approach for mounting flash units on cameras is to provide a shoe for receiving an electronic flash unit and a socket for plugging in the flash unit into the camera shutter control mechanism. But, this approach is not too attractive for the described type of cameras. First, cameras of the described type are usually adapted to supply the very low cost market — at least in some models. Thus, complex flash attaching means cost more than an acceptable amount. Second, cameras of the described type are designed for simplicity of operation. People who buy them do not want to fuss with adjustments, attachments, and the like. Thus, the conventional answer to flash unit attachments is no answer. On the expensive models of these cameras, the more sophisticated buyer does want to have more complex equipment.

Likewise, the usual answer to the "red eye" problem is not really a good answer. More particularly, the usual answer is to provide a long bracket, post, or the like for interposition between the camera and the flash unit to displace one from the other. This solution merely increases the number of parts required, the complexity of assembly, and the bother of using an unwieldy device.

Accordingly, an object of this invention is to provide new and improved universal electronic flash units which may be attached to any camera of a given type regardless of the manufacturer of the camera. Here, an object is to provide a flash unit which may be attached to a camera with special contacts, such as those normally associated with rotating flash cubes. In this connection, an object is to provide low cost electronic flash means which solve these and other problems.

Another object of the invention is to provide a compact flash unit for reducing and controlling "red eye." Here, an object is to eliminate separate adapter brackets, posts, or the like for attaching flash units to cameras.

Yet another object of the invention is to provide means for adapting other commercially available flash units to the inventive use.

In keeping with an aspect of this invention, these and other objects are accomplished by means of an electronic flash unit having a sliding or moveable contact which allows the flash unit to be longitudinally displaced with respect to the camera. The cross-section of the moving contact fits into the cross-section of contacts built into the camera. Thus, to adapt any flash unit to fit a particular camera type, it is only necessary for the manufacturer to substitute one sliding contact piecepart for another such part. In some cases, the sliding contact is not an electrical contact, but is merely a plastic plug for making a mechanical connection, the electrical circuit between the flash unit and camera being made by other means. For mechanical stability, the flash unit also includes a sliding bracket which may be either attached to a tripod socket on the camera or clamped onto the camera.

The nature of two preferred embodiments of the invention will become more apparent from a study of the attached drawings, wherein:

FIG. 1 is a perspective view of a pocket camera with the inventive flash unit attached thereto;

FIG. 2 is a disclosure of how the flash unit may be extended away from the camera to reduce "red eye;"

FIG. 3 is an exploded view showing how the inventive flash unit is attached to a camera;

Figure 6:
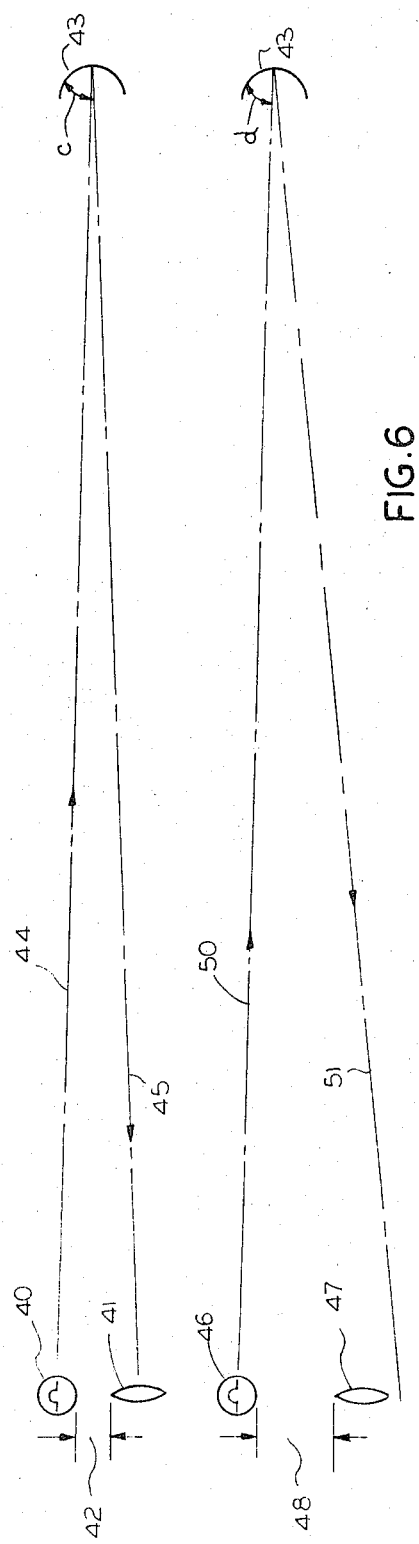

FIG. 6 schematically shows and explains how the principles of the invention may be used to reduce or control "red eye;"

FIG. 7 is an exploded view of a special c-clamp used to attach the flash unit to the camera;

FIG. 8 is a schematic end view showing the clamp of FIG. 7 in an open position;

FIG. 9 is a similar schematic end view showing the clamp of FIG. 7 in a closed position; and FIG. 10 is a fragmentary end view similar to the disclosure of FIG. 1; however, using the embodiment of the c-clamp shown in FIGS. 7-9 to attach the flash unit to the camera.

FIG. 1 shows a pocket type camera 20, an electronic flash unit 21, and a bracket 22. The camera 20 includes a view finder 24, a lens 25, and a shutter release push button 26. The camera also has a socket 28 for receiving a flash cube and a contact 29 to complete an electrical circuit for causing the flash to go off in synchronism with the shutter. The camera may also include any number of other controls, not shown.

Each manufacturer of this type of camera is prone to place the shutter release trigger 26, the flash cube socket 28, the contact 29, and other things, in any place convenient to its production. Thus, a flash unit designed for one make of pocket camera might well cover the shutter release push button 26, if placed on another make of pocket camera. Also, the flash window on the unit may be immediately above the lens in one pocket camera and displaced away from the lens on another pocket camera. Hence, it is not possible to provide a single, rigidly constructed flash unit which may be attached directly to all makes of pocket cameras.

According to one aspect of the invention, the flash unit 21 includes a post 35 mounted to slide back and forth in slot 36 in the directions A and B. This particular post is designed to fit down into a socket 28 which is normally adapted to receive a flash cube. The socket 28 rotates after each exposure in order to present a new side of the flash cube. Therefore, the post 35 is also able to rotate freely, without effect on the flash unit. Hence, the electronic flash unit 21 is supported by the socket 28 but is not influenced by the rotation thereof.

In this particular unit, the electrical contact is made when the member 29 is either energized or mechanically moved responsive to the shutter operation. The mating contact is formed on the bottom of the flash unit 21, either in the slot 36 or in an adjoining slot 37.

Hence, it should now be clear that the electronic flash unit 21 may be slipped back and forth as shown in FIG. 2. When the unit is in the extended position shown by dotted lines in FIG. 2, there is a sufficient distance between the flash and lens to control "red eye."

The principle of "red eye" reduction is seen in FIG. 6. When the flash source 40 and the lens 41 are separated by a small distance 42, the angle c of incidence at the retina 43 is small. The light 44 from the flash is reflected at 45 directly back into the lens. However, when the flash 46 and lens 47 are a greater distance 48 apart, the angle d of incidence at the retina 43 is larger. This time, the light 50 from the flash source 46 tends to be reflected at 51 below the lens. Hence, the retina does not normally show up in the picture as a beady red ball of fire.

To help stabilize the flash unit in the selected position, an "L-shaped" metal bracket 22 is attached at the end of one arm 55 to the flash unit 21 in any suitable manner, here shown as a bolt 56, by way of example. The bolt 56 is secured in a suitably threaded opening 57. The other end 58 of the bracket has a slot 59 formed therein for selectively enabling longitudinal positioning in directions A-B of the bracket with respect to the camera. To further help stabilize the flash unit mounted on the camera, a resilient tip 60 (such as rubber) may be secured to the lefthand (as viewed in FIG. 3) end of the bracket 58. This tip adds a second point of contact between bracket 58 and the camera to reduce wobble. If desirable, tip 60 may be mounted on the end of a screw or cam (not shown) to enable adjustability toward or away from the camera.

Thus, the camera and flash unit are positioned relative to each other, as shown by dotted lines in FIG. 2. Then, a thumb screw 61 is tightened. Thumb screws such as this are well known in the camera art.

Figure 5:
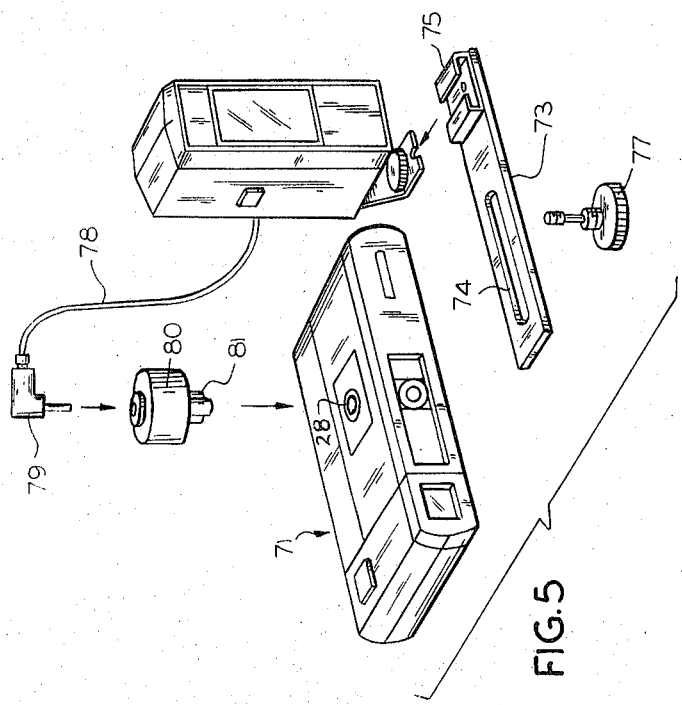
FIG. 5 is an exploded view showing the same bracket used to mount the flash unit on a pocket type camera.

Some people prefer to have a flash unit which is not dedicated to a particular type of camera. For example, they might want to use the same flash unit 69 on both an instant type camera 70 (FIG. 4) and on a pocket type camera 71 (FIG. 5). For them, an elongated bracket 73 is provided with a flash shoe 75 on one end and an elongated slot 74 on the other end. The slot enables the bracket 73 to be slid left or right to extend the flash unit 69 away from or to bring it up to the camera. Then, the thumb screw 77 is tightened.

The usual flash unit cord 78 has a conventional coupler 79 on the end thereof. To adapt the coupler 79 to use on a flash cube type of socket 28, an adapter 80 is provided with a post 81 which rotates, as a flash cube rotates, without effect upon the flash unit 69. Electrical contacts are built into the adapter 80 in order to complete the necessary connections for synchronizing the flash and shutter.

To facilitate and expedite the mounting of the flash on the camera, a quick disconnect c-clamp may be used in the manner shown in FIGS. 7-10. In greater detail, FIG. 7 shows, in exploded view, the parts of the c-clamp as including a c-bracket 90, a locking platform 91, and a cam 92.

The c-bracket 90 has a horizontal window 93 formed therein with axially displaced down-turned ears 94 on opposite sides thereof. A cam member 92 has a width w which fits into window 93 and between ears 94. The platform 91 also has oppositely disposed, down-turned ears 95,96 which fit over the ears 94 on the c-bracket 90. The top of platform 91 is at least partially covered with a pad of resilient, non-marring material 97 which helps grip the camera without moving it.

Means are formed in ears 94,95,96, and in cam 92 for assembling the parts together. In greater detail, the c-bracket ears 94 have inverted "V" slots 98 formed therein. The platform 91 ears 95,96 have elongated slots 99 formed therein. The cam 92 has a hole 100 formed in it. When these slots and holes are aligned, a pin 101 passes through them and is secured on each end as by swaging, by a c-washer, or by nuts, for example.

As seen in FIG. 7, the cam 92 has a short side s and a long side 1 separated by a rounded shoulder 102, with a lever arm 103 for selecting between the sides. In the cam position shown in FIG. 7, the short side s of cam 92 faces upwardly into the window 93. In this position the platform 91 is in a lowered position, as seen in FIG. 8. If the cam lever arm 103 is swung in direction A, the short side s of the cam moves out of window 93, and the long side 1 moves up and into the window. The rounded shoulder 102 rides over the underside of the platform 91, causing it to rise to an elevated position seen in FIG. 9. It should now be fairly obvious that pin 101 functions as a hinge pin for cam 92 and as a guide riding in the slots 98,99.

The flash unit 21 includes a small cavity or window 104 shaped for receiving an upper arm 105 on the c-clamp 90. Thus, it should be apparent that the post 35 may be slipped into socket 28 so that the flash gun 21 and camera 20 are brought into face to face contact. With the platform 91 lowered, as in FIG. 8, arm 105 is fitted into cavity 104 in the flash unit, and the bottom of the camera 20 is placed over the pad of resilient material 97. Then the lever arm 103 is moved in direction A to raise the platform 91 (FIG. 9) and clamp flash gun 21 to camera 20.

Figure 4:
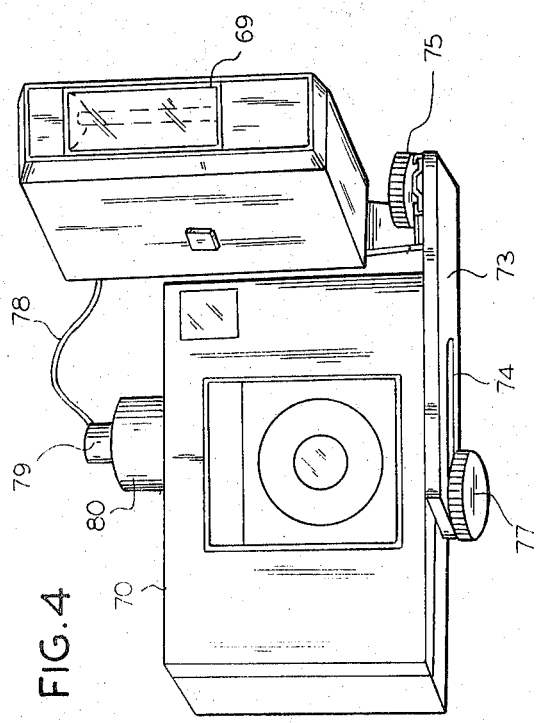
FIG. 4 shows an adapter using some of the inventive concepts for mounting a conventional flash unit on an instant type camera.

When the c-clamp of FIG. 7 is used with the embodiment of FIGS. 4 and 5, an added shoe 107 is attached in any suitable manner (such as welding) to the upper c-clamp arm 105. The conventional flash gun 69 may be mounted in this shoe after the c-clamp 90 has been attached to the camera.

Those who are skilled in the art will readily perceive modifications which may be made. Therefore, the appended claims should be construed broadly enough to cover all equivalent structures.

I claim:

1. A universal electronic flash unit having mounted thereon an integral longitudinally and rotatably moveable post with a cross-section which fits into a percussive flash cube socket built in a camera, said moveable post making a mechanical connection between said flash unit and said camera, means for completing an electrical circuit between said flash unit and a shutter synchronized operator on the camera, and means for mechanically stabilizing said mechanical connection, said stabilizing means comprising a longitudinally adjustable bracket for fixedly attaching said flash unit on the camera.

2. The flash unit of claim 1 and means for reducing "red eye" by displacing said flash unit on said camera by a distance fixed by said moveable post and said bracket.

3. The flash unit of claim 1 and means for attaching said flash unit on said camera at a position displaced far enough away from the camera lens so that the image reflected by the subject's eye will not normally directly strike the camera lens.

4. The flash unit of claim 1 wherein the moving post is a plastic plug for making said mechanical connection.

5. The flash unit of claim 1 wherein said bracket is slidingly attached to said camera by a thumb screw turned into a tripod socket on said camera.

6. The flash unit of claim 5 wherein said bracket has a resilient tip for providing a second point of attachment for cooperating with said thumb screw to reduce wobble between said bracket and camera.

7. The flash unit of claim 1 wherein said mechanical connection is free to rotate as a flash cube rotates on said camera.

8. A universal flash unit for mounting on a pocket type camera, the camera having a rotating socket for receiving a flash cube and a contact for completing an electrical circuit for causing the flash to go off in synchronism with the shutter, said flash unit comprising a housing including an electronic flash gun, a bracket for mounting the gun on the camera, and a freely rotatable post mounted to slide back and forth in a slot in said housing, said post being shaped to fit down into a socket in said camera which is normally adapted to receive a flash cube, the socket being further adapted to rotate after each exposure in order to present a new side of the flash cube, whereby the post is also able to rotate freely within said socket without effect on the flash unit.

9. The flash unit of claim 8 and electronical contact means which is operated responsive to the shutter operation of the camera for completing an electrical circuit to a contact area formed on the bottom of the flash unit, said area completing said electrical circuit regardless of the position where the flash unit is slid, whereby the electronic flash unit may be slipped back on the camera.

10. The flash unit of claim 9 wherein the flash unit may be positioned in an extended position with a sufficient distance between the flash and lens to reduce "red eye."

11. The flash unit of claim 10 and means for mechanically stabilizing the flash unit in the selected position, said stabilizing means comprising an "L-shaped" metal bracket attached at the end of one arm to the flash unit, the other end of the bracket having a slot formed therein for selectively enabling a longitudinal positioning of the flash unit in longitudinal position with respect to the camera.

* * * * *